United States Patent
Westerhoff et al.

(10) Patent No.: US 10,102,644 B2
(45) Date of Patent: Oct. 16, 2018

(54) METHOD AND A DEVICE FOR ESTIMATING AN ORIENTATION OF A CAMERA RELATIVE TO A ROAD SURFACE

(71) Applicant: Delphi Technologies, Inc., Troy, MI (US)

(72) Inventors: Jens Westerhoff, Wuppertal (DE); Stephanie Lessmann, Wuppertal (DE); Mirko Meuter, Erkrath (DE); Jan Siegemund, Cologne (DE)

(73) Assignee: Delphi Technologies, Inc., Troy, MI (US)

( * ) Notice: Subject to any disclaimer, the term of this patent is extended or adjusted under 35 U.S.C. 154(b) by 141 days.

(21) Appl. No.: 15/384,615

(22) Filed: Dec. 20, 2016

(65) Prior Publication Data

US 2017/0206674 A1   Jul. 20, 2017

(30) Foreign Application Priority Data

Jan. 15, 2016   (EP) .................................... 16151517

(51) Int. Cl.
*H04N 9/47* (2006.01)
*H04N 7/18* (2006.01)
(Continued)

(52) U.S. Cl.
CPC ............... *G06T 7/70* (2017.01); *B60R 11/04* (2013.01); *G06T 3/20* (2013.01); *G06T 7/60* (2013.01);
(Continued)

(58) Field of Classification Search
CPC .... G06T 7/70; G06T 7/60; G06T 7/97; G06T 3/20; G06T 2207/30244; G06T 2207/30252; B60R 11/04
(Continued)

(56) References Cited

U.S. PATENT DOCUMENTS 6,535,114 B1    3/2003   Suzuki et al.
2010/0157058 A1  6/2010   Feiden
(Continued)

FOREIGN PATENT DOCUMENTS

EP    2 736 013 A2   5/2014
EP    2 840 550 A1   2/2015

*Primary Examiner* — Jared Walker
(74) *Attorney, Agent, or Firm* — Lawrence D. Hazelton

(57) ABSTRACT

A method of estimating an orientation of a camera relative to a surface includes providing a first image and a subsequent second image captured by the camera; selecting a first point from the first image and a second point from the second image, where the first and second points represent the same object; defining a first optical flow vector connecting the first point and the second point; carrying out a first estimation step comprising estimating two components of the normal vector in the camera coordinate system by using the first optical flow vector and restricting parameter space to only the two components of the normal vector, wherein a linear equation system derived from a homography matrix that represents a projective transformation between the first image and the second image is provided and the two components of the normal vector in the camera coordinate system are estimated by solving the linear equation system; and determining the orientation of the camera relative to the surface using the results of the first estimation step.

16 Claims, 3 Drawing Sheets

(51) Int. Cl.
  *G06T 7/70* (2017.01)
  *G06T 7/00* (2017.01)
  *B60R 11/04* (2006.01)
  *G06T 3/20* (2006.01)
  *G06T 7/60* (2017.01)

(52) U.S. Cl.
  CPC ...... *G06T 7/97* (2017.01); *G06T 2207/30244* (2013.01); *G06T 2207/30252* (2013.01)

(58) Field of Classification Search
  USPC .......................................................... 348/148
  See application file for complete search history.

(56) References Cited

U.S. PATENT DOCUMENTS

| | | | |
|---|---|---|---|
| 2013/0044186 A1 | 2/2013 | Jin et al. | |
| 2014/0139674 A1* | 5/2014 | Aoki | H04N 7/18 |
| | | | 348/148 |
| 2015/0036885 A1* | 2/2015 | Pflug | G06T 7/0018 |
| | | | 382/104 |

* cited by examiner

METHOD AND A DEVICE FOR ESTIMATING AN ORIENTATION OF A CAMERA RELATIVE TO A ROAD SURFACE

CROSS-REFERENCE TO RELATED APPLICATION

This application claims the benefit under 35 U.S.C. § 119(a) of European Patent Application EP 16151517.6, filed 15 Jan. 2016, the entire disclosure of which is hereby incorporated herein by reference.

TECHNICAL FIELD OF INVENTION

This disclosure generally relates to a method and a device for estimating an orientation of a camera relative to a surface, in particular a road surface.

BACKGROUND OF INVENTION

Many vision based advanced driver assistance systems (ADAS) algorithms require information about the orientation, in particular, pitch and roll angles of the vehicle-mounted camera to the road surface. For instance, forward collision warning (FCW) systems determine the distance between the ego-vehicle and a preceding vehicle. In order to calculate this distance the orientation of the ego-vehicle to the road surface has to be known. If the camera orientation is not known sufficiently, FCW algorithms generate wrong output signals which can distract the driver or cause a risky steering or braking reaction.

It is usual practice to determine a static camera orientation, an extrinsic calibration, for stationary vehicles with the help of a calibration pattern. While a car moves, the orientation of the camera to the road surface is no longer static but time-dependent. Braking and acceleration maneuvers as well as road surface irregularities cause fast and notable camera orientation changes. Furthermore, a long-time orientation offset, which differs from the static calibration, can be caused by additional load.

The orientation of the camera to the road surface can be described by a homography that represents a projective transformation between two different images of the same plane, which is here the road surface, captured from two different camera positions. The extraction of angle information from a homography matrix is possible but not recommended due to parameter ambiguities.

SUMMARY OF THE INVENTION

It is an underlying object of the invention to provide a method that allows to efficiently estimate an orientation of a camera relative to a surface with low computational effort. It is further an object of the invention to provide a device for estimating an orientation of a camera relative to a surface.

The object underlying the invention is satisfied by the features of the independent claims. Advantageous further developments and aspects of the invention are set forth in the dependent claims.

In one aspect of the invention a method of estimating an orientation of a camera relative to a surface is provided, wherein a camera coordinate system is defined and a normal vector normal to the surface is represented by three components in the camera coordinate system. According to the method a first image and a subsequent second image captured by the camera are provided and a first point is selected from the first image and a second point is selected from the second image, wherein the first and second points represent the same object. Further, a first optical flow vector connecting the first point and the second point is defined. A first estimation step is carried out that comprises estimating two components of the normal vector in the camera coordinate system by using the first optical flow vector and restricting parameter space to only the two components of the normal vector. A linear equation system derived from a homography matrix that represents a projective transformation between the first image and the second image is provided and the two components of the normal vector in the camera coordinate system are estimated by solving the linear equation system. The orientation of the camera relative to the surface is determined using the results of the first estimation step.

The restriction of the parameter space to only two components of the normal vector allows a fast estimation of the orientation of the camera. No initial parameter guess is required to estimate the orientation.

In particular, a distance between the origin of the camera coordinate system and the surface, and the velocity of a vehicle on that the camera is mounted are parameters of the linear equation system.

In a further embodiment, a second estimation step subsequent to the first estimation step is carried out that comprises estimating the two components of the normal vector in the camera coordinate system again by using the first optical flow vector and setting the component of the normal vector neglected in the first estimation step to a value derived from the first estimation step. The two components of the normal vector in the camera coordinate system are estimated by solving the linear equation system. The orientation of the camera relative to the surface is determined by using the components of the normal vector estimated in the second estimation step.

In the second estimation step the component of the normal vector neglected in the first estimation step may be set to the inverse of the amount of the normal vector derived from the first estimation step.

In yet a further embodiment, a second optical flow vector is defined connecting a third point selected from the first image and a fourth point selected from the second image, wherein the third and fourth points represent the same object. The two components of the normal vector in the camera coordinate system are estimated in the first estimation step by using the first optical flow vector and the second optical flow vector. In particular, the two components of the normal vector in the camera coordinate system are estimated in the second estimation step by using the first optical flow vector and the second optical flow vector.

The method may comprise using a linear least squares estimation in the first estimation step and/or the second estimation step in order to estimate the two components of the normal vector in the camera coordinate system.

In one embodiment, a plurality of optical flow vectors each connecting a respective point in the first image and a respective point in the second image is defined, wherein both respective points represent the same object. The two components of the normal vector in the camera coordinate system are estimated for each of the plurality of optical flow vectors by carrying out the first estimation step and in particular the second estimation step. The optical flow vector that produces the highest number of inliers is determined, in particular by using a random sample consensus procedure.

In addition, the two components of the normal vector may be estimated in the camera coordinate system by carrying out the first estimation step and in particular the second estimation step for all inliers. The determination of the orientation of the camera relative to the surface may comprise determining a pitch angle and a role angle of the camera relative to the surface. The pitch angle and the role angle may be determined several times and may be filtered, in particular by a Kalman filter. The rotation and translation of the camera between capturing the first image and capturing the second image may be provided by a vision based egomotion estimation using an MSAC (M-estimator sample consensus) algorithm. Translational and rotational parts of the egomotion may be estimated separately in an iterative scheme. An iterative weighted linear least squares approach may be used with a normalized discrete epipolar constraint.

According to a further embodiment a plurality of inliers are obtained as a result of the MSAC algorithm and for each of the inliers the corresponding optical flow vector length is calculated using the rotation and translation of the camera between capturing the first image and capturing the second image provided by the MSAC algorithm. Each of the inliers is weighted according to the corresponding optical flow vector length, and the translation of the camera between capturing the first image and capturing the second image is estimated again using the weighted inliers.

The camera may be mounted on a vehicle and the surface may be a road surface. In particular, the vehicle comprises a system with an ADAS algorithm, in particular a camera based ADAS system, for example a FCW, lane departure warning (LDP) or pedestrian detection (PED) system.

According to a further aspect of the invention a device for estimating an orientation of a camera relative to a surface is provided, wherein a camera coordinate system is defined and a normal vector normal to the surface is represented by three components in the camera coordinate system. The device is configured to receive a first image and a subsequent second image captured by the camera, select a first point from the first image and a second point from the second image, wherein the first and second points represent the same object, define a first optical flow vector connecting the first point and the second point, carry out a first estimation step comprising estimating two components of the normal vector in the camera coordinate system by using the first optical flow vector and restricting parameter space to only the two components of the normal vector, wherein the two components of the normal vector in the camera coordinate system are estimated by solving a linear equation system derived from a homography matrix that represents a projective transformation between the first image and the second image, and determine the orientation of the camera relative to the surface using the results of the first estimation step.

The device may comprise the embodiments disclosed above in connection with the method of estimating an orientation of a camera relative to a surface.

BRIEF DESCRIPTION OF DRAWINGS

The invention will be described in more detail in the following in an exemplary manner with reference to an embodiment and to the drawings. There are shown in these.

DETAILED DESCRIPTION

Figure 1:
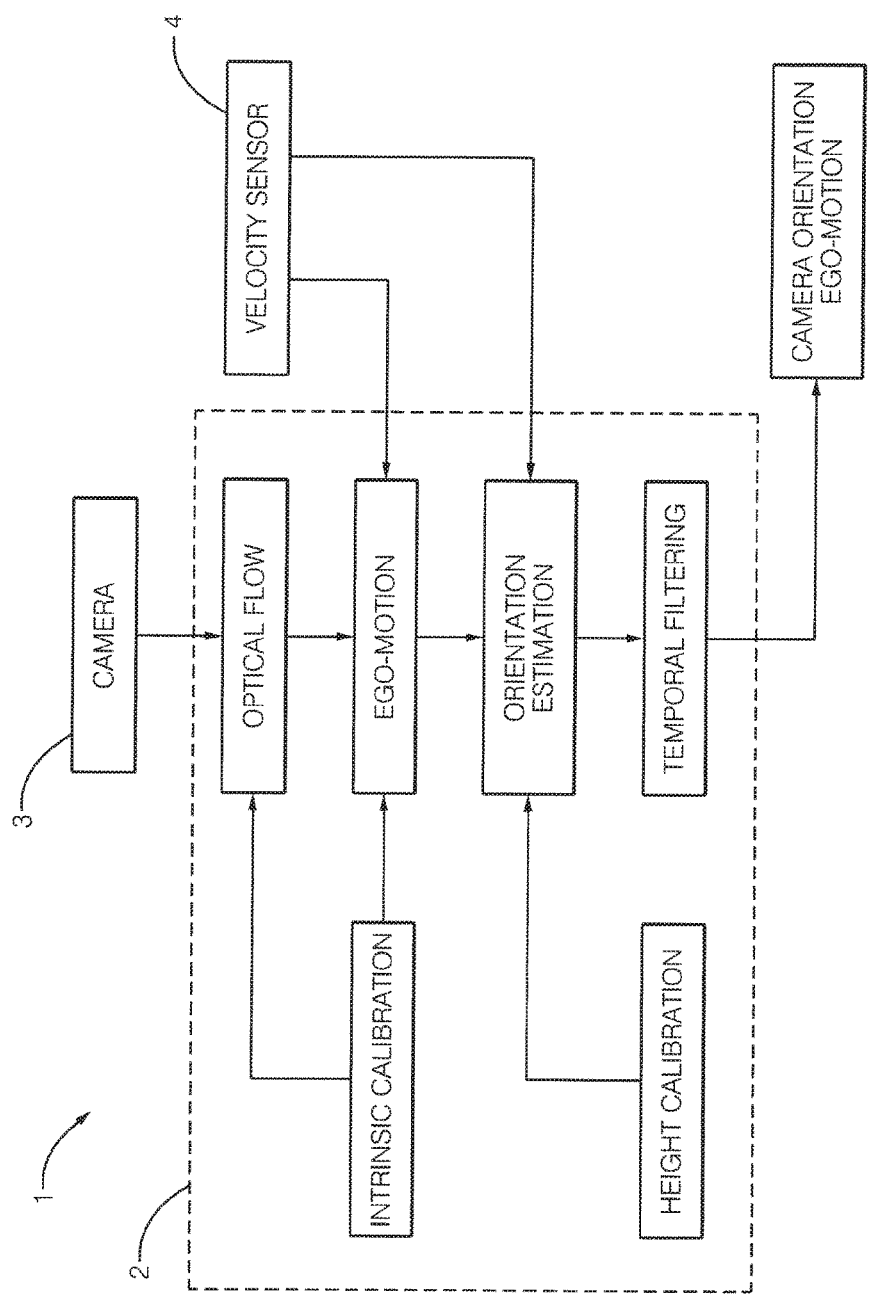
FIG. 1 is a schematic representation of a system and a device for estimating an orientation of a camera relative to a road surface.

A system 1 for estimating an orientation of a camera relative to a road surface is schematically illustrated in FIG. 1. The system 1 includes a device 2, a camera 3 and a velocity sensor 4. In the instant embodiment, the camera 3 is mounted on a vehicle and captures images, for example, of the area in front of the vehicle. The velocity sensor 4 measures the velocity of the vehicle. The camera 3 and the velocity sensor 4 provide the device 2 with the captured images and the measured velocity data, respectively. The device 2 uses the captured images and the measured velocity data in order to estimate and output data regarding orientation and motion of the camera 3. For that purpose, the device 2 may include a processor and employs the algorithms explained in the following.

Figure 2:
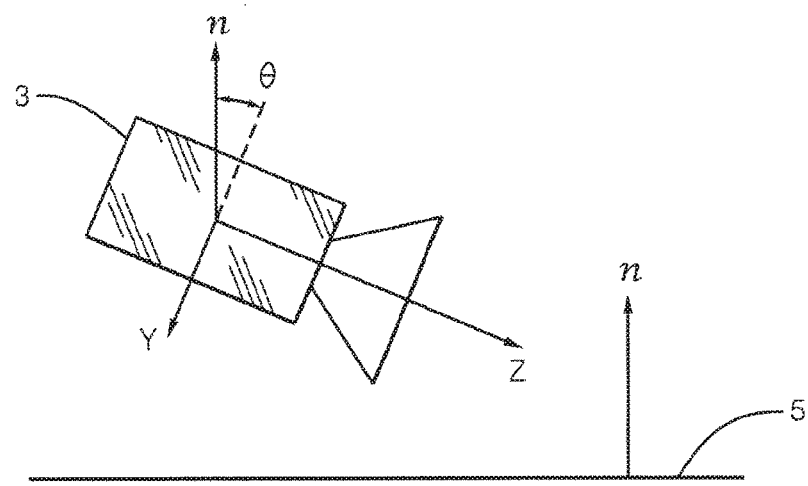
FIG. 2 is a schematic representation of a camera side view illustrating the geometry of the pitch angle $\theta$.
Figure 3:
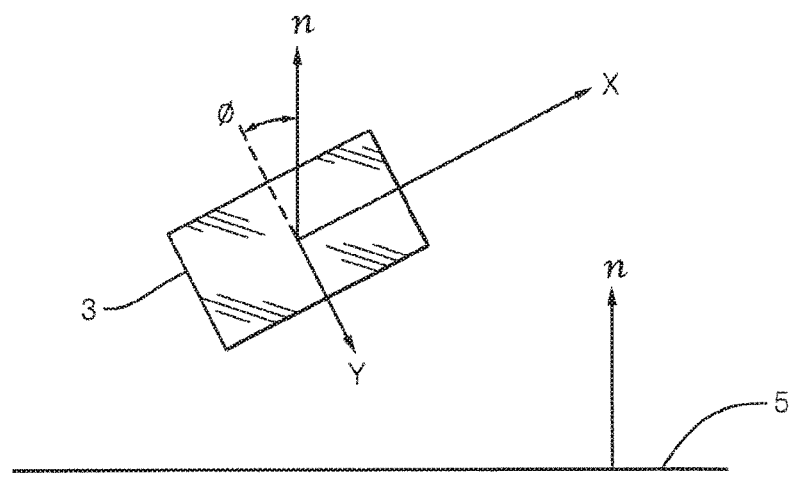
FIG. 3 is a schematic representation of a camera rear view illustrating the geometry of the roll angle $\Phi$.

The homography between two images of the road surface 5 captured from successive poses of the moving vehicle includes information about the camera's roll and pitch angle relative to the road surface 5. The used coordinate system is defined in FIGS. 2 and 3, which show side and rear views of the camera 3, respectively. The coordinate system is fixed to the camera 3 and has orthogonal coordinates x, y and z. The normal vector of the road surface 5 is $n=[n_x, n_y, n_z]^T$. FIG. 2 shows the y-z-plane of the coordinate system where a pitch angle $\theta$ is defined as the angle between the projection of the normal vector n onto the y-z-plane and the y-axis. FIG. 3 shows the x-y-plane of the coordinate system where a roll angle $\Phi$ is defined as the angle between the projection of the normal vector n onto the x-y-plane and the y-axis.

The pitch angle $\theta$ and the roll angle $\Phi$ between the camera 3 and the road surface 5 are also defined by equations (1) and (2):

$$\theta = -\arctan\frac{n_z}{n_y} \quad (1)$$

$$\Phi = \arctan\frac{n_x}{n_y} \quad (2)$$

Information about the pitch angle $\theta$ and the roll angle $\Phi$ is included in a homography which represents a projective transformation between two different images of the road surface 5 captured subsequently from two different positions of the camera 3. A homography matrix H is defined as follows $$H = K\left(R - \frac{tn^T}{d}\right)K^{-1} \quad (3)$$

and includes the intrinsic camera calibration matrix K, the distance d between the origin of the coordinate system of the camera 3 and the road surface 5, and the relative rotation R and translation t between the two camera positions. The metric translation t is calculated by t=t'vs consisting of a normalized translation vector t', the vehicle velocity v measured by the velocity sensor 4 and the time s elapsed between the two image captures.

A priori information is used to solve the estimation problem. The vehicle's velocity v is provided via a bus system and the time s between two image captures is given in the data sheet of the camera 3. The distance d can be measured and is assumed to be constant. The intrinsic camera calibration K is known by a standard calibration procedure. The components R and t', which are called egomotion, of the homography can either be provided by an inertial measurement unit (IMU) or by a vision based motion estimation. Here a vision based approach is employed to determine egomotion, which is discussed in more detail further below.

The normal vector n is estimated to estimate the pitch angle θ and the roll angle Φ. The normal vector n in the homography is conditioned by $\|n\|=1$. With that knowledge the estimation problem is reduced from three parameters ($n_x$, $n_y$, $n_z$) to two parameters, namely $n_x$ and $n_z$, to obtain the pitch angle θ and the roll angle Φ.

The camera 3 captures a first image and, subsequently after the time s, the camera 3 captures a second image. For the angle estimation algorithm optical flow (OF) vectors serve as input data. An OF vector linearly connects two points in two different images which represent the same object in the world. Therefore, a first point from the first image and a second point from the second image are selected, wherein the first and second points represent the same object. A first OF vector connects the first point and the second point.

The positions of the points in the images connected by OF vectors are represented by homogenous vectors $p=[p_1, p_2, p_3]^T$ for the first image and $q=[q_1, q_2, q_3]^T$ for the second image. The homography matrix H transforms the homogenous vector p to the homogenous vector $$q=Hp. \quad (4)$$

In order to calculate the image coordinates (u, v) we can write $$u = \frac{q_1}{q_3} \quad (5)$$

and $$v = \frac{q_2}{q_3}. \quad (6)$$

To obtain the desired normal components $n_x$ and $n_z$ we insert equation (4) into equations (5) and (6). Each component of the homography matrix H as given in equation (3) is then dissembled into its parts containing the single components of R, t, n, d and K. In order to achieve a simple formula representation following sections use the scaled translation $\tilde{t}=t/d$ and normalized coordinates. After rearranging the equations we obtain the linear equation system $$\begin{bmatrix} a_1 & b_1 \\ a_2 & b_2 \end{bmatrix} \begin{bmatrix} n_x \\ n_z \end{bmatrix} = \begin{bmatrix} c_1 \\ c_2 \end{bmatrix} \quad (7)$$

with the sought normal vector components $n_x$, $n_z$ and $$a_1 = -q_1 \tilde{t}_3 p_1 + \tilde{t}_1 p_1 \quad b_1 = -q_1 \tilde{t}_3 p_3 + \tilde{t}_1 p_3 \quad (8)$$

$$a_2 = -q_2 \tilde{t}_3 p_1 + \tilde{t}_2 p_1 \quad b_2 = -q_2 \tilde{t}_3 p_3 + \tilde{t}_2 p_3 \quad (9)$$

Variables $c_1$, $c_2$ consist of the remaining parts of the rearranged equations $$c_1 = q_1 R_{31} p_1 + q_1 (R_{32} - \tilde{t}_3 n_y) p_2 + q_1 R_{33} p_3 - R_{11} p_1 - (R_{12} - \tilde{t}_1 n_y) p_2 - R_{13} p_3 \quad (10)$$

and $$c_2 = q_2 R_{31} p_1 + q_2 (R_{32} - \tilde{t}_3 n_y) p_2 + q_2 R_{33} p_3 - R_{21} p_1 - (R_{22} - \tilde{t}_2 n_y) p_2 - R_{23} p_3 \quad (11)$$

which are not connected to $n_x$ or $n_z$. $R_{ij}$ (i, j=1, 2, 3) in equations (10) and (11) are the elements of the 3×3 matrix R. Equation (7) is an inhomogeneous equation system and for this reason we are able to solve it with the help of simple least-squares technique with low computational effort.

In a first estimation step, the second component $n_y$ of the normal vector n is initially assumed to be −1 (pitch angle θ=0°, roll angle Φ=0°) for the estimation. After solving the least-squares problem (equation (7)) the result violates the condition $\|n\|=1$, if the pitch angle θ and the roll angle Φ differ from 0°. In order to deal with this issue, a second estimation step is carried out after the first estimation step.

In the second estimation step, we calculate $n_y=-1/\|n\|$ and do the estimation again with the updated $n_y$, wherein the amount $\|n\|$ of the normal vector n is calculated from the results of the first estimation step. In general, this procedure reduces $\|n\|$ to <1.0004 which satisfies our accuracy demands. We choose this heuristic approach in order to avoid involving the additional constraint $\|n\|=1$ directly to the optimization problem because this would result in a non-linear problem.

In theory, the approach of defining the parameter space to $[n_y, n_z]^T$ enables us to estimate the pitch and roll angle from only a single OF vector. Instead of using one OF vector we can use two OF vectors to achieve a better conditioned problem. In this case, a third point is selected from the first image and a fourth point is selected from the second image, wherein the third and fourth points represent the same object. A second OF vector connects the third point and the fourth point. The first and second estimation steps can then be carried out as described above by using the first OF vector and the second OF vector.

The assumption that the road surface is the dominant plane allows us to use a random sample consensus (RANSAC) procedure to determine which OF vectors belong to the road surface and which do not. A number N of OF vectors is used for the RANSAC procedure, wherein each of the OF vectors connects a respective point in the first image and a respective point in the second image. For each of the OF vectors the first and second estimation steps are carried out as described above and an estimation of the normal vector n is obtained. In addition, the results obtained from each of the OF vectors are used to verify the quality of the estimation. From the vectors p in the first image and the results obtained from the estimation of the normal vector n the vectors q in the second image are calculated. The vectors q obtained from the estimation are compared to the vectors q obtained from the second image.

The inlier/outlier decision of the RANSAC approach is made by thresholding the error between the point warped by the estimated homography and the OF vector end point. The higher the number of inliers for an OF vector, the higher is the quality of the estimation based on this OF vector.

The final estimate of the normal vector n is done by solving the linear equation system which consists of all RANSAC inliers. An estimate how many RANSAC iterations N are needed can be done by $$N = \frac{\log(1-p)}{\log(1-(1-e)^s)} = \frac{\log(1-0.99)}{\log(1-(1-0.4)^2)} = 10 \quad (12)$$

for which p is the probability to get at least one flow vector belonging to the road (see Richard Hartley and Andrew Zisserman. Multiple view geometry in computer vision. Cambridge university press, 2003). Parameter e defines which proportion of the OF vectors do not belong to the road surface and s represents the amount of OF vectors which is necessary to calculate n. The result N=10 of equation (12) indicates that only very little RANSAC iterations are needed to obtain an estimate of the normal vector's components to obtain the pitch angle θ and the roll angle Φ of the camera 3.

From the OF based estimation approach we finally obtain the normal vector components as well as the pitch angle θ and the roll angle Φ of the camera 3 relative to the road surface 5. Additional information is provided by the relative pitch Δθ and the relative roll angle ΔΦ between the first and the second image which can be obtained from the egomotion rotation matrix R. There two information sources are combined into a Kalman filter. Two separate Kalman filters with the same structure are used to estimate the final pitch and roll angle of the camera 3 for every time step. The system model $$x_k = x_{k-1} + u_k + w_k \qquad (13)$$

uses x=θ, x=Φ, respectively. The control input $u_k$ at time k represents the relative angles Δθ and ΔΦ obtained from egomotion. The process noise $u_k$ is assumed to reflect a normal distribution (zero mean) with variance of the egomotion angle estimation. In the measurement model equation $$z_k = x_k + v_k \qquad (14)$$

the observation noise $v_k$ is determined by evaluating the homography based pitch and roll estimation variance in the experiments. In order to ensure that the Kalman filters are defined properly and in order to obtain thresholds for outlier detection we apply $\chi^2$ test. In theory the weighted innovation of the Kalman filter $y_k^T S_k^{-1} y_k$ ($y_k$ innovation residual, $S_k$ innovation covariance) follows a $\chi^2$ distribution (see Yaakov Bar-Shalom. Kalman filtering techniques for radar tracking: K. V. Ramachandra; 2000 Marcel Dekker, New York, ISBN: 0-8247-9322-6. Automatica, 37(6):957-958, 2001). For instance, if we take a look at a $\chi^2$ table we see that 5% of the weighted innovation of the data should be above a value of 3.8 for our 1-dimensional filter. This fits well to our experimental data. Furthermore, measurements generating an weighted innovation >3.8 are treated as outliers and the update step of the Kalman filter is not applied.

In the following vehicle egomotion estimation is described. The egomotion estimation is, in particular, employed to obtain the relative rotation R and the translation vector t between the two camera positions.

Vehicle egomotion estimation using monocular vision is a difficult and important problem in vision based driver assistance system application. This difficulties occur mainly from the motion into baseline (camera translation) direction which makes the underlying minimization problem sensitive to noise. Additionally, the environmental conditions like other moving objects, moving shadows in sunlight, but also rain on the windshield and the moving wiper will induce extra outliers which have to be neglected to obtain reliable results. Once the egomotion is computed it serves as input for many other problems, like distance estimation in FCW systems, where the pitching of the car lead to gross errors in the determined solution and homography based ground plane estimation, and thus, as such should not waste too much computation time.

Figure 4:
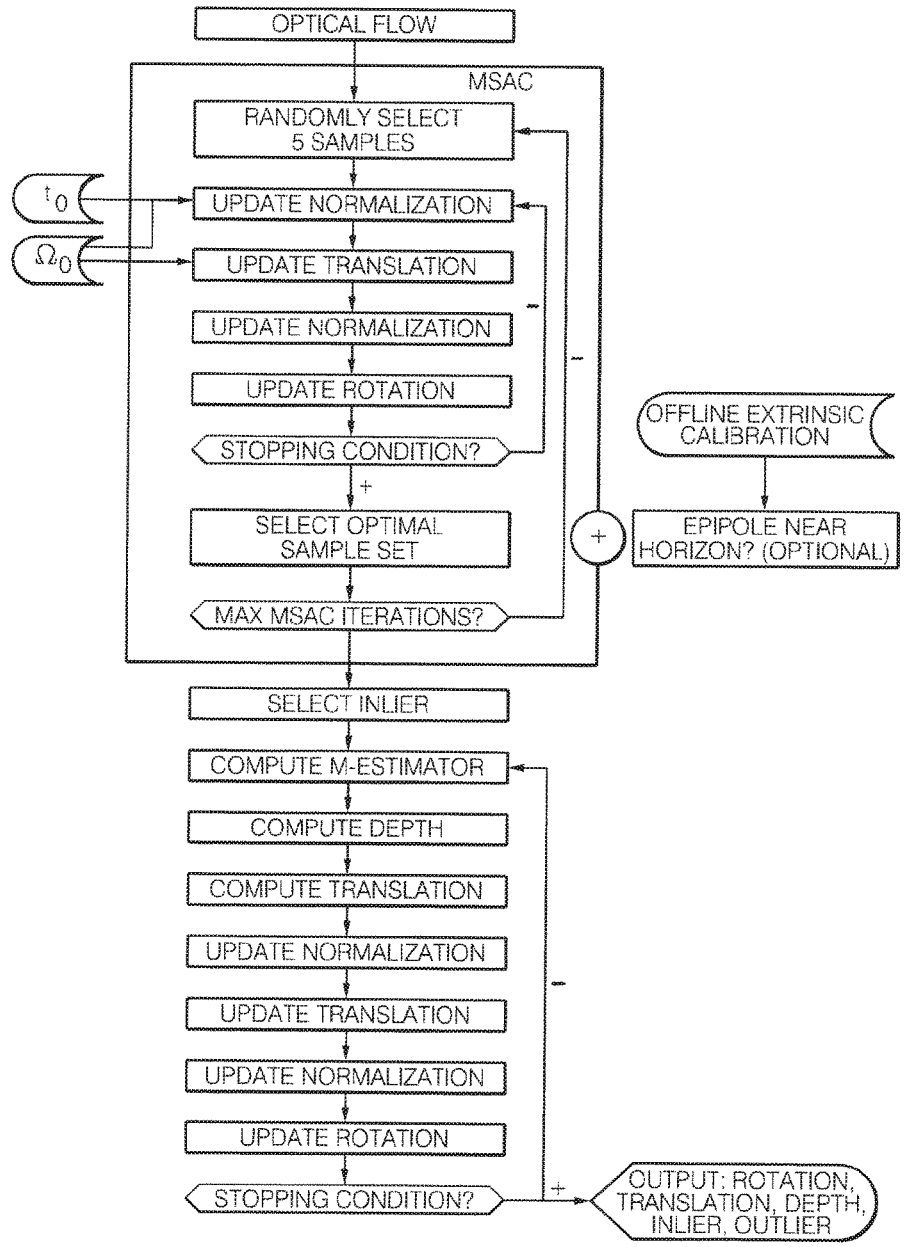
FIG. 4 is a flow chart illustrating vehicle egomotion estimation.

The approach for robust egomotion estimation presented herein includes M-estimator sample consensus (MSAC), which is based on RANSAC and further includes an M-Estimator. Further, transitional and rotational parts of the egomotion are evaluated separately in an iterative scheme where we use a special constraint and add additional weighting parameters. Here we distinguish explicitly between estimation of the translation and the rotation as rotation influences nearby and distant point, while we have only small amount of translation on the points far away. As constraint we take the normalized discrete epipolar constraint (Sampson distance) and use it in an iterative weighted linear least squares approach. These distances are used to determine the weights for our least squares problem in every iteration step. Further we can find a more efficient formulation for our equations to save additional computation steps. In order to handle outliers we add robust estimation methods like MSAC and M-estimator which allow us to segment the image into foreground (other moving objects or optical flow outliers) and background motion (egomotion) and enhance this with the use of prior information based on the horizontal motion of a vehicle. The algorithm was also successfully tested online and thus is suitable for real time application as it converges really fast. FIG. 4 shows a flow chart illustrating the algorithm used herein.

Starting from a pyramidal implementation of the KLT feature tracker (see Bouguet, Jean-Yves. Pyramidal implementation of the affine lucas kanade feature tracker description of the algorithm. Intel Corporation, 5:1-10, 2001) for optical flow we derive M feature tracks from the current image i captured by the camera 3 to the next consecutive image i+1 $\{(x_j^{(i)}, x_j^{\prime(i+1)}) | j=1 \ldots M\}$ on a uniform sample grid in image i. Optical flow is filtered before by unfeasible track length making use of a quadratic constraint with input from the vehicle velocity sensor. In the remaining part of this outline we assume that our coordinates are given in undistorted canonical form, as our intrinsic calibration parameters are known. Our target is now to compute the rotation R and the translation t of the camera 3 from image to image. The next steps are derived from the epipolar constraint $(x_j^{\prime(i+1)})^T \hat{t} R x_j^{(i)} = 0$, with the head operator $\hat{(\cdot)}$, which describes the cross product in terms of a skew-symmetric matrix. Instead of minimizing $$S^{(i)} = \sum_j (\psi^{ij}(R,t))^2 \qquad (15)$$

with $$\psi^{ij}(R,t) := \frac{1}{\mu^{ij}} (x_j^{\prime(i+1)})^T \hat{t} R x_j^{(i)} \qquad (16)$$

and the normalization term $$\mu_j^i(R,t) = \|(\hat{e}_3)^T \hat{t} R x_j^{(i+1)} + (x_j^{\prime(i+1)})^T \hat{t} R \hat{e}_3\|_2, \qquad (17)$$

with the third unit vector $e_3$, (see Hedborg, Johan and Felsberg, Michael. Fast iterative five point relative pose estimation. Robot Vision (WORV), 2013 IEEE Workshop on, pages 60-67, 2013. IEEE) using iterative solvers like Levenberg Marquart, we will derive two systems of linear equations, which will be solved in an iterative scheme. If we assume the small angle approximation for the rotational components (this is reasonable for our purpose) the rotation matrix will become $R_A(\Omega) \approx I + \hat{\Omega}$ with $\Omega = [\omega_x \ \omega_y \ \omega_z]^T$. In the estimation process the translation t can only be estimated up-to-scale, we therefore constrain $t = [t_x \ t_y \ t_z]^T$ such that $\|t\|_\infty = 1$, which means in terms of vehicle egomotion we can assume that the third translational component $t_z = -1$ (translation of points into negative direction). Let $\tilde{X}^{ij} = x_j^{(i)} x_j^{\prime(i+1)}$. From now on we will neglect the image parameter i for simplicity and just contemplate two consecutive images. From the expansion of the epipolar constraint we can derive the bilinear equation:

$$\begin{bmatrix} \omega_x \\ \omega_y \\ \omega_z \\ 1 \end{bmatrix}^T \underbrace{\begin{bmatrix} -\tilde{X}_9^j - \tilde{X}_5^j & \tilde{X}_4^j & \tilde{X}_7^j \\ \tilde{X}_2^j & -\tilde{X}_1^j - \tilde{X}_9^j & \tilde{X}_8^j \\ \tilde{X}_3^j & \tilde{X}_6^j & -\tilde{X}_1^j - \tilde{X}_5^j \\ \tilde{X}_6^j - \tilde{X}_8^j & -\tilde{X}_3^j + \tilde{X}_7^j & \tilde{X}_2^j - \tilde{X}_4^j \end{bmatrix}}_{A_j} \begin{bmatrix} t_x \\ t_y \\ -1 \end{bmatrix} = 0. \quad (18)$$

Hence we want to find the least squares solution $$(\Omega, t') = \underset{\Omega, T}{\arg\min} \sum_{j=1}^{M} \left( \begin{bmatrix} \Omega \\ 1 \end{bmatrix} \cdot A_j \cdot t \right)^2 \quad (19)$$

with $$t' = \begin{bmatrix} t_x \\ t_y \end{bmatrix}.$$

Document "Bal, E and Liu, Yun. On the least squares solutions of a system of bilinear equations" (IEEE CONFERENCE ON DECISION AND CONTROL, number 2, pages 1197, 2005. IEEE; 1998) mentions a linear iterative scheme to solve bilinear least squares problems and also establish fast convergence for this algorithm. In document "Narendra, Kumpati S and Gallman, Philip G. An iterative method for the identification of nonlinear systems using a Hammerstein model" (Automatic Control, IEEE Transactions on, 11(3):546-550, 1966) convergence was further proven for the normalized case. We will adopt the idea of this iterative scheme for our purpose and solve two linear least squares problems iteratively, but with the addition that our right side of the equation is also dependent on the estimation parameters. First we rewrite the equation (18) in terms of t and $\Omega$:

$$\begin{bmatrix} \omega_x \\ \omega_y \\ \omega_z \\ 1 \end{bmatrix}^T \underbrace{\begin{bmatrix} -\tilde{X}_9^j - \tilde{X}_5^j & \tilde{X}_4^j \\ \tilde{X}_2^j & -\tilde{X}_1^j - \tilde{X}_9^j \\ \tilde{X}_3^j & \tilde{X}_6^j \\ \tilde{X}_6^j - \tilde{X}_8^j & -\tilde{X}_3^j + \tilde{X}_7^j \end{bmatrix}}_{A_t(\tilde{X}_j, \Omega)} \begin{bmatrix} t_x \\ t_y \end{bmatrix} = \begin{bmatrix} \omega_x \\ \omega_y \\ \omega_z \\ 1 \end{bmatrix}^T \underbrace{\begin{bmatrix} \tilde{X}_7^j \\ \tilde{X}_8^j \\ -\tilde{X}_1^j - \tilde{X}_5^j \\ \tilde{X}_2^j - \tilde{X}_4^j \end{bmatrix}}_{b_t(\tilde{X}_j, \Omega)} \quad (20)$$

and analog:

$$\begin{bmatrix} t_x \\ t_y \\ -1 \end{bmatrix}^T \underbrace{\begin{bmatrix} -\tilde{X}_9^j - \tilde{X}_5^j & \tilde{X}_2^j & \tilde{X}_7^j \\ \tilde{X}_4^j & -\tilde{X}_1^j - \tilde{X}_9^j & \tilde{X}_6^j \\ -\tilde{X}_7^j & -\tilde{X}_8^j & \tilde{X}_1^j + \tilde{X}_5^j \end{bmatrix}}_{A_\Omega(X_j, t')} \begin{bmatrix} \omega_x \\ \omega_y \\ \omega_z \end{bmatrix} = b_\Omega(\tilde{X}_j, t') \quad (21)$$

with $$b_\Omega(\tilde{X}_j, t') = \begin{bmatrix} t_x \\ t_y \\ -1 \end{bmatrix}^T \begin{bmatrix} -\tilde{X}_6^j + \tilde{X}_8^j \\ \tilde{X}_3^j - \tilde{X}_7^j \\ \tilde{X}_2^j - \tilde{X}_4^j \end{bmatrix}.$$

We now proceed the following way using weighted linear least squares for every equation. Therefore the normalization term $\mu_j$ is used as weighting and linearized twice in every iteration and the least squares functions are defined as follows:

$$l_{t'}(\Omega, \mu) = \sum_j \frac{1}{\mu_j} \|A_t(\tilde{X}_j, \Omega)t' - b_t(\tilde{X}_j, \Omega)\|_2^2, \quad (22)$$

and $$l_\Omega(t', \mu) = \sum_j \frac{1}{\mu_j} \|A_\Omega(\tilde{X}_j, t')\Omega - b_\Omega(\tilde{X}_j, \Omega)\|_2^2. \quad (23)$$

Then the algorithm can be described

---
Algorithm 1 Solving $\Omega$, t iteratively
---
Require: Optical Flow computed from the former to the current frame and converted to canonical undistorted coordinates ($x_j$, $x_j'$), initial $\Omega_0$, $t_0$
1:   function COMPUTEEGOMOTION($\Omega$, t, $x_j$, $x_j'$)
2:
3:       $\Omega \leftarrow \Omega_0$
4:       $t \leftarrow t_0$
5:       $\tilde{X}_j \leftarrow x_j \times x_j'$
6:       repeat
7:
8:           $\mu_t^{(k)} \leftarrow \mu_j(R_A(\Omega^{(k-1)}), t^{(k-1)})$
9:           $t^{(k)} \leftarrow \arg\min_{t'} l_{t'}(\Omega^{(k-1)}, \mu_t^{(k)})$
10:          $\mu_\Omega^{(k)} \leftarrow \mu_j(R_A(\Omega^{(k-1)}), t^{(k)})$
11:          $\Omega^{(k)} \leftarrow \arg\min_\Omega l_\Omega(t^{(k)}, \mu_\Omega^{(k)})$
12:      until converge As shown above, the algorithm includes that in each iteration step the normalization terms $\mu_t^{(k)}$ and $\mu_\Omega^{(k)}$ are calculated and, subsequently, translation and rotation are updated using the calculated normalization terms $\mu_t^{(k)}$ and $\mu_\Omega^{(k)}$, respectively.

In order to save computational cost we can formulate equations (20) and (21) in a more efficient way using $x_j = [(x_j)_1 \ (x_j)_2 \ 1]^T$ and $x'_j = [(x'_j)_1 \ (x'_j)_2 \ 1]^T$, if we define:

$$a_t^j = (x_j)_1 \cdot \omega_y - (x_j)_2 \cdot \omega_x - 1, \quad (24)$$

$$b_t^j = (x_j)_1 \cdot \omega_z + (x_j)_2 \cdot \omega_x, \quad (25)$$

$$c_t^j = (x_j)_2 \cdot \omega_z - \omega_y - (x_j)_1, \quad (26)$$

$$d_t^j = (x'_j)_2 \cdot a_t^j + b_t^j, \quad (27)$$

$$e_t^j = -(x'_j)_1 \cdot a_t^j + c_t^j, \text{ and} \quad (28)$$

$$f_t^j = -(x'_j)_2 \cdot c_t^j - (x'_j)_1 \cdot b_t^j. \quad (29)$$

Then equation (20) can be shortened to:

$$\begin{bmatrix} d_t^j & e_t^j \end{bmatrix} \begin{bmatrix} t_x \\ t_y \end{bmatrix} = f_t^j. \quad (30)$$

For the rotational part we define:

$$a_\Omega^j = t_x \cdot (x'_j)_2 - t_y \cdot (x'_j)_1, \quad (31)$$

$$b_\Omega^j = -(x'_j)_1 - t_x, \quad (32)$$

$$c_\Omega^j = -(x'_j)_2 - t_y, \quad (33)$$

$$d_\Omega^j = (x_j)_1 \cdot a_\Omega^j + c_\Omega^j, \quad (34)$$

$$e_\Omega^j = -(x_j)_2 \cdot a_\Omega^j + b_\Omega^j, \quad (35)$$

$$f_\Omega^j = -(x_j)_1 \cdot b_\Omega^j - (x_j)_2 \cdot c_\Omega^j, \text{ and} \quad (36)$$

$$g_\Omega^j = -(x_j)_1 \cdot c_\Omega^j + (x_j)_2 \cdot b_\Omega^j + a_\Omega^j. \quad (37)$$

The rotational equation (21) then becomes:

$$[d_\Omega^j \quad e_\Omega^j \quad f_\Omega^j] \begin{bmatrix} \omega_x \\ \omega_y \\ \omega_z \end{bmatrix} = g_\Omega^j. \quad (38)$$

If we are not using simulated data for optical flow hypothesis generation, the problem of outlier occurs in real world scenarios as the solution of the optical flow problem itself is difficult. The quality of the egomotion estimation suffers from that and therefore robust estimation is needed. One approach is to use RANSAC (see Fischler, Martin A and Bolles, Robert C. Random sample consensus: a paradigm for model fitting with applications to image analysis and automated cartography. Communications of the ACM, 24(6): 381-395, 1981), where the model is first computed from random selected minimal sets of optical flow samples and after that the solution is selected which minimizes the cost function $$C_1 = \sum_j \rho(e_j^2) \quad (39)$$

with $$\rho(e_j^2) = \begin{cases} 0 & e_j^2 < \tau^2 \\ const & e_j^2 \geq \tau^2 \end{cases}. \quad (40)$$

for a chosen threshold $\tau$ and the residual error $e_j$.

In documents "Torr, Phil and Zisserman, Andrew. Robust computation and parametrization of multiple view relations" (Computer Vision, 1998. Sixth International Conference on, pages 727-732, 1998. IEEE) and "Torr, Philip H S and Zisserman, Andrew. MLESAC: A new robust estimator with application to estimating image geometry" (Computer Vision and Image Understanding, 78(1):138-156, 2000) a further concept was presented called MSAC (M-estimator sample consensus). The cost function $\rho(\bullet)$ changes to $$\rho(e_j^2) = \begin{cases} e_j^2 & e_j^2 < \tau^2 \\ \tau^2 & e_j^2 \geq \tau^2 \end{cases}. \quad (41)$$

The difference now is that inliers also get a penalty depending on their data fitting. The constant threshold for the outlier remains constant but now is given through the exact threshold bound. Because MSAC has proven to be more robust opposite to RANSAC in motion estimation application, we decided to use MSAC for our approach. After the MSAC routine further estimation is performed on all inliers in the image provided by the minimal solution from the sample set from the MSAC step. Further we will integrate a M-estimator to further improve our results. Here we tested the Huber k-estimator $W_H(\bullet)$ $$w_H(e_j) = \begin{cases} 1 & |e_j| \leq k \\ \dfrac{k}{|e_j|} & |e_j| > k \end{cases}. \quad (42)$$

and included this as additional weighting in every linear least squares step of our algorithm extending the already mentioned weight $\mu_j$.

As distant points only have a small amount of translation, we want to prefer those features which have an appropriate optical flow vector length for the translation estimation after the MSAC loop. We therefore multiply a weight called $w_d^j$ to the weights we mentioned before. This weight is defined the following way:

$$w_d^j = \begin{cases} 1 & \dfrac{v \cdot s \cdot f}{Z^j} \|p\|_2 > \delta \\ 0 & \text{else} \end{cases}, \quad (43)$$

with $$p = \begin{bmatrix} -t_x + t_z \cdot (x_j)_1 \\ -t_y + t_z \cdot (x_j)_2 \end{bmatrix} \quad (44)$$

for a chosen threshold $\delta$ which describes the optical flow vector length. Here the translation is normalized to 1 using the euclidean norm, f denotes the focal length of the camera model, $Z^j$ is the triangulated depth of the appropriate 3D-Point, v is the vehicle velocity and s the time between two images. The depth is updated after every iteration step as well as the weight $w_d^j$ using the updated translation. Instead of using a discretized weight it is also possible to use a scaled version between 0 and 1.

Often we have prior knowledge about the parameters which we will also want to consider, e.g., approximately forward motion into FOE-direction or both epipoles should be near a fixed horizon line $h_y$, which is calibrated before. But we also do not want to rely too strictly on this assumption. We include this additional information using a Tikhonov-like model in the MSAC-step, instead of directly discard estimated model parameters for a sample set, which do not fit to the prior information. If we denote the y-coordinate of the left epipole with $E_y^L(\Omega, t)$ and the right epipole with $E_y^R(\Omega, t)$ respectively which are dependent on rotation and translation, the cost function $C_1$ changes to $$C_2 = \Sigma_j \rho(e_j^2) + \lambda_1 \cdot \|E_y^L(\Omega,t) - h_y\|_2^2 + \lambda_2 \|E_y^R(\Omega,t) - h_y\|_2^2 \quad (45)$$

with $\lambda_1, \lambda_2 \geq 0$. The parameters $\lambda_1, \lambda_2$ have to be chosen carefully to only slightly influence the best model selection.

The inlier selection itself can also be enhanced by triangulating our feature tracks and apply a positive depth constraint, because all the points visible in the video image should have a positive depth.

We claim:

1. A method of estimating an orientation of a camera relative to a surface, wherein a camera coordinate system is defined and a normal vector normal to the surface is represented by three components in the camera coordinate system, the method comprising: providing a first image and a subsequent second image captured by the camera; selecting a first point from the first image and a second point from the second image, wherein the first and second points represent the same object; defining a first optical flow vector connecting the first point and the second point; carrying out a first estimation step comprising estimating two components of the normal vector in the camera coordinate system by using the first optical flow vector and restricting parameter space to only the two components of the normal vector, wherein a linear equation system derived from a homography matrix that represents a projective transformation between the first image and the second image is provided and the two components of the normal vector in the camera coordinate system are estimated by solving the linear equation system; and determining the orientation of the camera relative to the surface using the results of the first estimation step; carrying out a second estimation step subsequent to the first estimation step that comprises estimating the two components of the normal vector in the camera coordinate system again by using the first optical flow vector and setting the component of the normal vector neglected in the first estimation step to a value derived from the first estimation step, wherein the two components of the normal vector in the camera coordinate system are estimated by solving the linear equation system and the orientation of the camera relative to the surface is determined by using the components of the normal vector estimated in the second estimation step.

2. The method as claimed in claim 1, wherein in the second estimation step the component of the normal vector neglected in the first estimation step is set to the inverse of the amount of the normal vector derived from the first estimation step.

3. The method as claimed in claim 1, said method further comprising
selecting a third point from the first image and a fourth point from the second image, wherein the third and fourth points represent the same object;
defining a second optical flow vector connecting the third point and the fourth point;
estimating the two components of the normal vector in the camera coordinate system in the first estimation step by using the first optical flow vector and the second optical flow vector; and
estimating the two components of the normal vector in the camera coordinate system in the second estimation step by using the first optical flow vector and the second optical flow vector.

4. The method as claimed in claim 1, said method further comprising
using a linear least squares estimation in the first estimation step and/or the second estimation step in order to estimate the two components of the normal vector in the camera coordinate system.

5. The method as claimed in claim 1, said method further comprising
defining a plurality of optical flow vectors each connecting a respective point in the first image and a respective point in the second image, wherein both respective points represent the same object; estimating the two components of the normal vector in the camera coordinate system for each of the plurality of optical flow vectors by carrying out the first estimation step and in particular the second estimation step; and
determining the one of the optical flow vectors that produces the highest number of inliers, in particular by using a random sample consensus procedure.

6. The method as claimed in claim 5, said method further comprising
estimating the two components of the normal vector in the camera coordinate system by carrying out the first estimation step and in particular the second estimation step for all inliers.

7. The method as claimed in claim 1, wherein determining the orientation of the camera relative to the surface comprises determining a pitch angle and a role angle of the camera relative to the surface.

8. The method as claimed in claim 7, comprising
determining the pitch angle and the role angle several times and filtering, in particular Kalman filtering, the pitch angle and the role angle.

9. The method as claimed in one claim 1, wherein a rotation and a translation of the camera (3) between capturing the first image and capturing the second image are provided by a vision based egomotion estimation using an MSAC (M-estimator sample consensus) algorithm.

10. The method as claimed in claim 9, wherein a translational part and a rotational part of the egomotion are estimated separately in an iterative scheme.

11. The method as claimed in claim 9, wherein an iterative weighted linear least squares approach is used with a normalized discrete epipolar constraint.

12. The method as claimed in claim 9, wherein a plurality of inliers are obtained as a result of the MSAC algorithm and for each of the inliers the corresponding optical flow vector length is calculated using the rotation and translation of the camera between capturing the first image and capturing the second image provided by the MSAC algorithm, wherein each of the inliers is weighted according to the corresponding optical flow vector length and the translation of the camera between capturing the first image and capturing the second image is estimated again using the weighted inliers.

13. The method as claimed in claim 1, wherein the camera is mounted on a vehicle and the surface is a road surface.

14. A device for estimating an orientation of a camera relative to a surface, wherein a camera coordinate system is defined and a normal vector normal to the surface is represented by three components in the camera coordinate system, the device is configured to receive a first image and a subsequent second image captured by the camera, select a first point from the first image and a second point from the second image, wherein the first and second points represent the same object, define a first optical flow vector connecting the first point and the second point, carry out a first estimation step comprising estimating two components of the normal vector in the camera coordinate system by using the first optical flow vector and restricting parameter space to only the two components of the normal vector, wherein the two components of the normal vector in the camera coordinate system are estimated by solving a linear equation system derived from a homography matrix that represents a projective transformation between the first image and the second image, and determine the orientation of the camera relative to the surface using the results of the first estimation step; carrying out a second estimation step subsequent to the first estimation step that comprises estimating the two components of the normal vector in the camera coordinate system again by using the first optical flow vector and setting the component of the normal vector neglected in the first estimation step to a value derived from the first estimation step, wherein the two components of the normal vector in the camera coordinate system are estimated by solving the linear equation system and the orientation of the camera relative to the surface is determined by usinq the components of the normal vector estimated in the second estimation step.

15. A method of estimating an orientation of a camera relative to a surface, wherein a camera coordinate system is defined and a normal vector normal to the surface is represented by three components in the camera coordinate system, the method comprising: providing a first image and a subsequent second image captured by the camera; selecting a first point from the first image and a second point from the second image, wherein the first and second points represent the same object; defining a first optical flow vector connecting the first point and the second point; carrying out a first estimation step comprising estimating two components of the normal vector in the camera coordinate system by using the first optical flow vector and restricting parameter space to only the two components of the normal vector, wherein a linear equation system derived from a homography matrix that represents a projective transformation between the first image and the second image is provided and the two components of the normal vector in the camera coordinate system are estimated by solving the linear equation system; and determining the orientation of the camera relative to the surface using the results of the first estimation step; defining a plurality of optical flow vectors each connecting a respective point in the first image and a respective point in the second image, wherein both respective points represent the same object; estimating the two components of the normal vector in the camera coordinate system for each of the plurality of optical flow vectors by carrying out the first estimation step and in particular the second estimation step; and determining the one of the optical flow vectors that produces the highest number of inliers, in particular by using a random sample consensus procedure.

16. The method as claimed in claim 15, said method further comprising estimating the two components of the normal vector in the camera coordinate system by carrying out the first estimation step and in particular the second estimation step for all inliers.

* * * * *